(12) United States Patent
Jakobson et al.

(10) Patent No.: US 7,779,475 B2
(45) Date of Patent: Aug. 17, 2010

(54) SOFTWARE-BASED METHOD FOR GAINING PRIVACY BY AFFECTING THE SCREEN OF A COMPUTING DEVICE

(75) Inventors: Gabriel Jakobson, Las Vegas, NV (US); Steven L. Rueben, Las Vegas, NV (US)

(73) Assignee: PetNote LLC, Las Vegas, NV (US)

( * ) Notice: Subject to any disclaimer, the term of this patent is extended or adjusted under 35 U.S.C. 154(b) by 1031 days.

(21) Appl. No.: 11/496,382

(22) Filed: Jul. 31, 2006

(65) Prior Publication Data

US 2008/0025645 A1    Jan. 31, 2008

(51) Int. Cl.
*G06F 12/14* (2006.01)
(52) U.S. Cl. ...................................... 726/26
(58) Field of Classification Search ........................ None
See application file for complete search history.

(56) References Cited

U.S. PATENT DOCUMENTS

| | | | |
|---|---|---|---|
| 2,286,570 A | 6/1942 | Pollack | |
| 4,812,709 A | 3/1989 | Dudasik | |
| 4,826,245 A | 5/1989 | Entratter | |
| 4,832,458 A | 5/1989 | Fergason | |
| 5,614,920 A * | 3/1997 | Coteus et al. | 345/7 |
| 5,831,698 A | 11/1998 | Depp | |
| 6,262,843 B1 | 7/2001 | Marx | |
| 6,552,850 B1 | 4/2003 | Dudasik | |
| 7,523,316 B2 * | 4/2009 | Cheng et al. | 713/182 |

* cited by examiner

*Primary Examiner*—Brandon S Hoffman

(57) ABSTRACT

A method and apparatus for allowing the user of an electronic device to enhance privacy over a display with the use of software, are disclosed. A security window including a translucent graphical effects region may be displayed on the electronic device such that it overlays content the user may choose to protect. The security window allows the protected content to remain discernable for the user of the device yet substantially indiscernible to a person at a further distance and/or greater viewing angle from the screen of the device. One or more security windows, each of which may be of any size, shape, texture, translucency level and any other graphical or behavioral properties may be displayed on the display associated with the electronic device. The user may control the size, shape, texture, translucency level and any other graphical or behavioral properties of the security window and graphical effects region. The user may invoke or terminate a security window with the single click of a button. Security windows may automatically attach to applications in focus, or be attached in response to a user command, and allow uninterrupted usability of those applications.

27 Claims, 15 Drawing Sheets

SOFTWARE-BASED METHOD FOR GAINING PRIVACY BY AFFECTING THE SCREEN OF A COMPUTING DEVICE

FIELD OF INVENTION

The present invention relates to computer graphics applications. More particularly, the present invention relates to the application of graphics software to reduce the legibility of a computer screen to a potential viewer.

BACKGROUND OF THE INVENTION

The evolution of computer screens has been progressively achieving higher resolution, brightness, sharpness, response time and contrast ratio. As screens are becoming larger, brighter and sharper, they are generally easier to read from a greater distance and wider angles. For example, laptops with passive-matrix screens, popular in the late 1990s, have been replaced with active-matrix, or TFT screens, in which each pixel is illuminated. The direct result is that a computer's TFT screen appears clearer and easier to read from a greater distance and wider viewing angle. New technologies continue to improve computer screens by increasing brightness and reducing glare, making screens easier to read in daylight and from greater distances and wider angles.

While the trend of bigger, better, brighter, and sharper screens offers a great benefit to the user, it also presents a drawback: the content of the screen may be more visible to prying eyes in the vicinity of the user. The proliferation of portable computers and their usage at public places, coupled with their larger-and-better-than-ever screens, compromise privacy. For example, more and more corporate users use their portable computers for work of potentially sensitive nature-ordinarily conducted behind closed doors in an office—at public places such as coffee shops and airplanes, where their screens could be read by dozens of people at any given time.

In recognition of the increased need for privacy demanded by computer users, hardware manufacturers have introduced hardware-based monitor security devices. Examples of hardware-based monitor security devices include computer privacy filters, or screens (collectively, privacy filters, unless otherwise noted), introduced by companies such as 3M®, feature a physical device that is adhered to, or placed over, a computer screen. Once such privacy filter is applied (i.e. placed over or adhered to) to a computer screen, its optics are designed to distort the view of the computer screen, when viewed from a wide angle or greater distance. The usage of a privacy filter may keep information displayed away from prying eyes, as a person to either side of the user may find their view of the computer screen distorted and intangible. Other related hardware-based monitor security devices are computer LCD screens that are manufactured in such way that they can be "read" (or viewed in a tangible way) only by a user sitting directly in front of them.

Hardware-based monitor security devices have multiple drawbacks. Among these drawbacks is the bulk and inconvenience, especially for mobile computing. Some filters are not easily removed from a monitor to allow viewing without the distorting effect of the screen, which users may want to do when security is less of a concern (as when a computer user may be using the computer to show something to others). Additionally, hardware monitor security devices in the form of privacy screens are ineffective in giving the audience of a presentation on a large display, such as an LCD projector or large flat screen TV, privacy from prying audience who may be standing a substantial distance away. (e.g. a LCD projected presentation at a company board room with glass walls, where people standing outside the room may be able to see sensitive projected information). There are other limitations and drawbacks of hardware monitor security devices to those described above.

DESCRIPTION OF THE DRAWINGS

For a more complete understanding of the present invention and further advantages thereof, references are now made to the following Detailed Description, taken in conjunction with the drawings, in which.

SUMMARY OF THE INVENTION

A software-implemented method for allowing a user to enhance privacy over any portion of their computer's display, is disclosed. The user may choose to display one or more translucent region(s) over any portion of their screen in such a manner as to allow the user to discern the content covered by the region, while making the task of discerning the content covered by the region more difficult to a person at a greater distance and wider angle to the screen, than the user. The translucent region may be turned on and off randomly by the user, via a pointing device, keyboard command, software hot-key, designated key on the keyboard or any other method. The user may control the translucent region's shape, size, position, opaqueness and other behavioral characteristics. Applications covered by the translucent region are unaffected by it in terms of behavior. The translucent region may be optimized in such a manner as to have a minimal impact on the user sitting in front of the screen—so that they can read content covered by the translucent region with minimal strain—while offering the maximum obstruction to viewers further and at wider angles to the screen than the user. Different patterns may be applied to the translucent region, either automatically or at the user's choosing, so as to optimize its effectiveness under various conditions. The user may manually choose the pattern to be applied to the translucent region from a library of patterns; or, allow the software to choose, apply and adjust a pattern automatically. The user may move and reposition the translucent region over an application manually; or, instruct the software to track an application and reposition the translucent region automatically.

DETAILED DESCRIPTION

Figure 1:
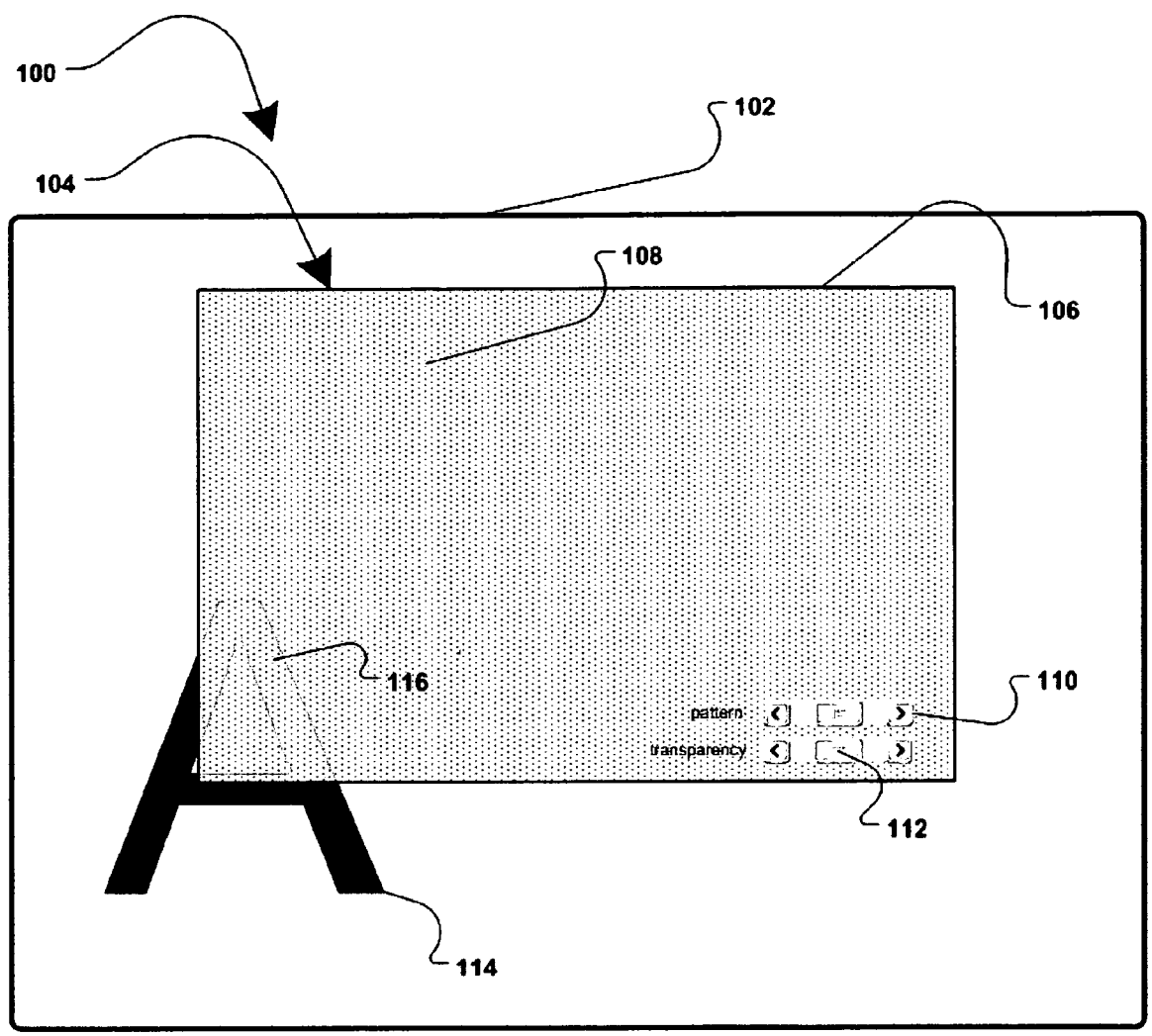
FIG. 1 is a generalized block diagram illustrating a security region according to one possible embodiment.
Figure 3:
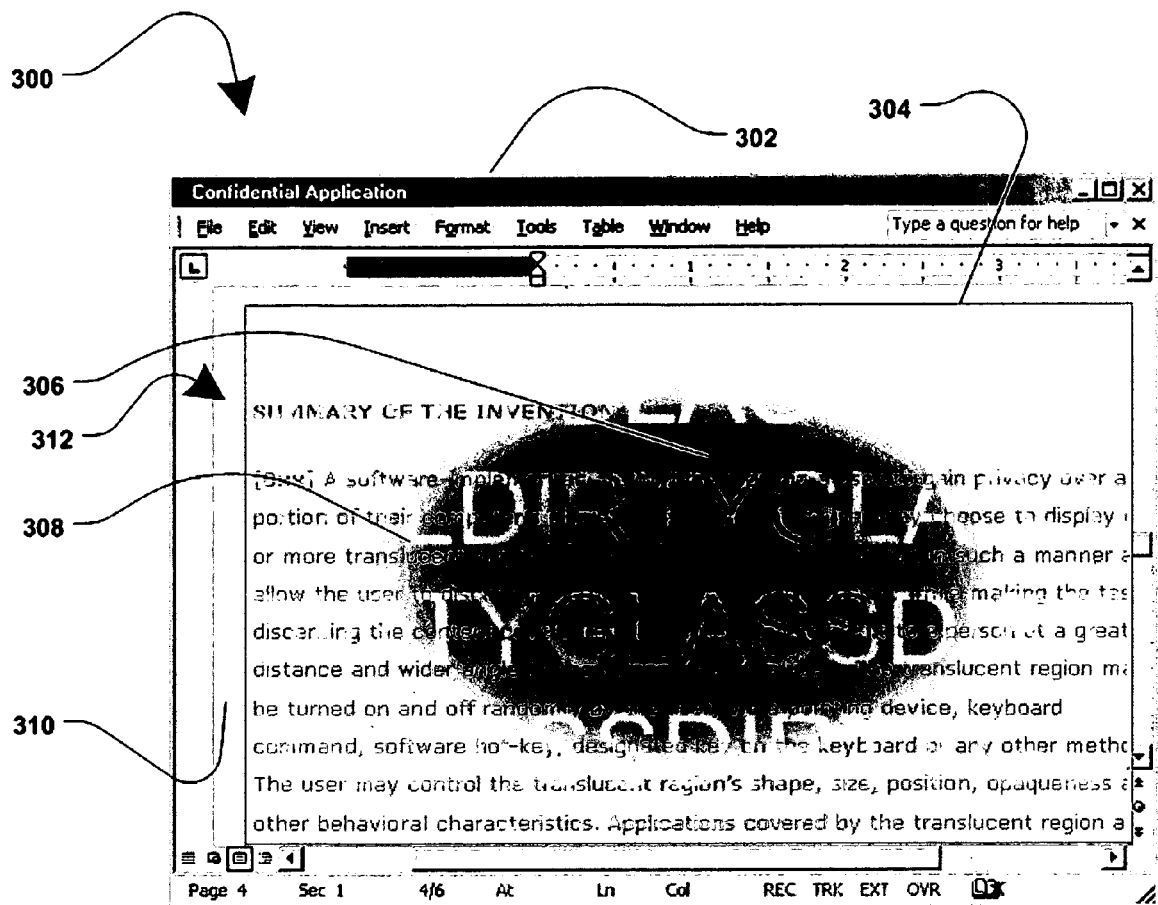
FIG. 3 is a generalized block diagram illustrating another embodiment where a filter window covers an application displayed on a user's device, such that the covered application may be discernable to a user sitting in close proximity to the display device and not as discernable to a user viewing from a greater distance and angle.

FIG. 1 is a generalized block diagram illustrating one possible embodiment of a system 100 allowing a user to enhance (or gain) privacy over their computer display 102. Unless otherwise noted, the terms computer and computer display are meant to include any computing devices capable of displaying information either along or in connection with other devices, including, without limitation, personal computers, servers, PDAs, terminals and kiosks, mobile computing devices, mobile hones, projectors, etc. Computer display 102 may be the entire visible desktop of an operating system such as Microsoft Windows® as it is displayed on a computer screen such as the LCD screen of a laptop or a desktop computer. Alternatively, the computer display may be for either a portion of the visible desktop, or of more than one visible desktop. A security region 104 may be displayed at any position of a user's visible display 102. the security region may be any size or shape, as desired or needed to cover the portion of the monitor the user wishes to enhance security. Security region 104 may include a border 106. Security region 104 includes one or more security graphical effects 108. In the presently preferred embodiment, the graphical effects 108 occupies the entire area inside the security region 104 (inside the border area in an embodiment with a border) Border 106 may provide for resizing the security region (or security window) 104, as is a common practice with applications displayed in a framed window in an operation system such as Microsoft Windows®. Graphical effects 108 may contain one or more effects, colors, patterns, shapes, images and any other graphical effects. For example, Graphical effects 108 may have dynamic effects which change the effect, color, pattern, etc. to enhance security. Graphical effects 108 is translucent so that it may allow a user viewing display screen 102 to see objects 114 on display 102 "covered" by region 104. The objects may be text, images, or other graphical elements as rendered by computers and computer applications. The visibility of objects 114 which are covered by region 104 are distorted by the graphical effects 108 to a user viewing display device 102. In one preferred embodiment, the user may be presented with graphical effects control 110 which allows the user to alter the graphics of the graphical effects 108. in embodiments with the graphical effects control, the graphical effects control 110 may be permanently displayed in the security region 104, or may be temporarily displayed (when the region is activated, or in response to a command from the user). In another embodiment of the present invention, the user may use graphical monitor (or display) such that the covered application 302 may be discernable to a user sitting in relative close proximity to the display device and not as discernable to a user viewing from a greater distance and/or at a greater angle. Application 302, may be any type of application which may run on a computing device, including, without limitation, viewers, word processors, document creation and editing programs, spreadsheets or financial programs, graphics or CAD-CAM programs, contact or calendaring programs, security programs (such as a password managers, or portions of the operating system. For example, a window to view the contents of a folder or a command line prompt). Security region 304 may cover a portion of the application 302, leaving a portion 310 of the application 302 uncovered. Uncovered region 310 of application 302 may receive user input as application 302 may be considered to be "in focus" (or "in use") by the operating system running on that device. When user input is received by an operating system running on a user device, the operating system determines which application is in focus and passes to it the user input. The security region 304 does not change the user's ability to interact with an application, yet enhances the security by altering tiling of applications typically performed by conventional operating systems to allow the security region 304 to remain "on top" of the application 302 (or portion of the application 302) despite user inputs to application 302. As such, the keeping of the security region 304 "on top" may be performed by the operating system (for example in an embodiment where the security region is part of the operating system), as part of the application 302 or as a separate application. The user may position security region 304 manually, using a pointing device, to a shape and size allowing the security region 304 to cover only a portion of application 302. Or, in another embodiment of the present invention, the user may instruct security region 304 to "attach" itself to application 302 such that when the user repositions application 302, security region 304 "follows" it and repositions itself accordingly, such that it may cover the same portion of application 302 in application's 302 new position. As shown in FIG. 3, the security region covers the working area of the application 302, i.e., the area of the application where a user may view, create, and/or modify a document or data. In one embodiment the security region 304 may be set to cover the working area of an application 302, either by a command from the computer user or by default. In yet another embodiment of the present invention, security region 304 may be part of the application 302, and its operation may be configurable as to the area covered, whether it is automatically deployed or effects control 110 for selecting the graphical effects 108 from a library of patterns. The user may also be presented with a second graphical effects control 112 for altering the transparency level of the graphical effects 108, thereby affecting the visibility of objects 114 covered by the graphical effects 108, visible to a user viewing display device 102. The user may use graphical effects control 110 and 112 to optimize the visual quality of graphical effects 108 such that objects 114 obscured by security region 104 are readable to the user while sitting at a normal distance in front of display 102—yet are substantially indiscernible to another person at a greater distance and/or wider angle viewing display 102. Additional graphical controls may also be presented to the user, either together, sequentially, or in response to a command from the user. In this manner, the present invention allows for adjusting of the security enhancement to suit the possible security threat posed by the users surroundings.

Figure 2:
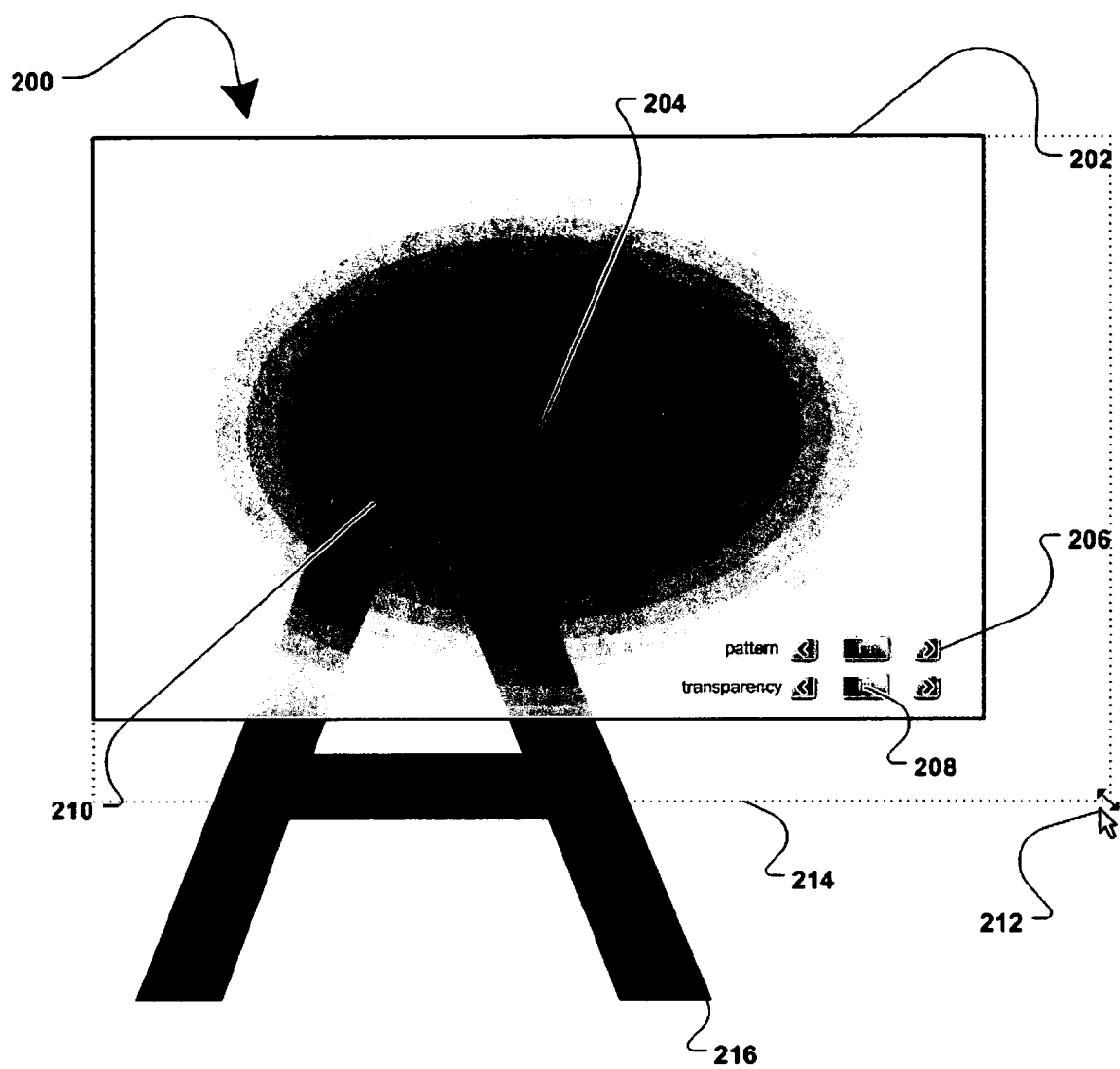
FIG. 2 is a generalized block diagram illustrating another embodiment of the present invention where a gradient shading pattern is used to enhance privacy over objects on a user's display

FIG. 2 illustrates an alternate embodiment of the present invention where a gradient shading is used to enhance privacy over objects on a user's display. Security region 200 includes a graphical effect 204 which is a shading pattern. The security region 200 may include a border (or frame) 202. Frame 202 may be used by the user, in conjunction with an input or pointing device 212 (e.g. a mouse, stylus, keyboard, etc.) to stretch security region 200 or reposition it in accordance with the visual and physical characteristics 214 of a window being stretched or repositioned in an operating system such as Microsoft Windows®. In one preferred embodiment of the present invention, graphical effect 204 may be a radial gradient with the darkest shading at the center of security region 200 and lightest at the periphery of the security region 200. Objects 216 on the screen may be partially obscured by the security region 200 with their obscured portion 210 visible through the translucent graphical effect 204. Graphical effect 204 may automatically adjust to fit security region 200 as security region 200 is resized. The user may use a graphical control 206, such as a scrollbar, for altering graphical effect 204. The user may use additional graphical controls 208, such as a scrollbar, for altering the translucency level of graphical effect 204, in a way which may affect the visibility of objects 210 which are covered by security region 200.

FIG. 3 is a generalized block diagram illustrating another embodiment wherein a security region 304 covers an application 302 displayed on a user's deployed only upon command from the computer user, and the nature and extent of the security provided by the graphical effect.

Secuirty window 304 may include a shaded, translucent region 306 as the graphical effect. The shading 306 of filter window 304 may be in darker color so as to allow a user in proximity to the display device to read the content of a document 312 displayed in covered-application 302, through region 306. Alternatively, the shading 306 may be in a lighter color, or may be in a different color which is not noticeably darker or lighter than the area of the desktop covered by (or adjacent to) the security region. To a person at a greater distance from the display device, discerning the content of document 312, when viewed "under" shaded region 306, may be comparatively more difficult, as the dark shading of region 306 may tend to appear more like a solid dark cover. In the current embodiment, region 306 may contain a watermark 308 which may be in some form of a tangible text or pattern, in a different color, brightness or contrast than shading pattern 306, and substantially translucent.

Figure 4:
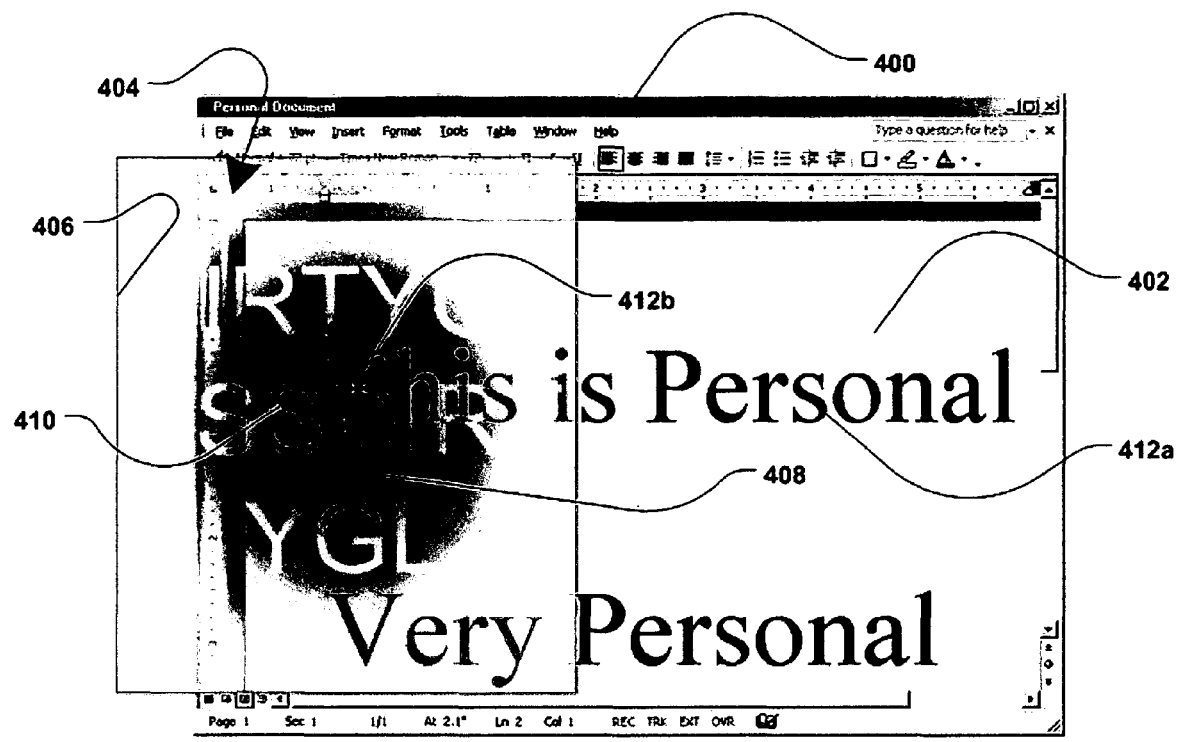
FIG. 4 is a generalized block diagram illustrating another embodiment where a filter window, containing a watermark, covers a portion of an application displayed on a user's device, such that the covered portion of application may not be as discernable to a user viewing from a greater distance and angle.

FIG. 4 is a generalized block diagram illustrating another embodiment of the present invention where a secure region 404 covers a portion of an application 400 displayed on a user's device, such that the covered portion of application 400 may be discernable to a user sitting in close to proximity to the display device and less discernable to a user viewing from a greater distance and/or viewing angle. Document 402 displayed within application 400 may contain text 412a and 412b. Secure region 404 may cover a portion of application 400 and may include a frame 406, a graphical effects area 408 and a watermark 410. As shown, the graphical effects used is a radial gradient. A user may adjust the position and size of secure region 404 such that it only covers a specific portion of document 402. When viewed by a user in close proximity to the display, the text-portion 412b of document 402 covered by filter window 404, may be almost as discernable as the portion 412a which is not covered. A person viewing application 400 from a greater distance and wider angle, may find discerning text-portion 412b to be much more difficult than discerning text-portion 412a, as the graphical effects area 408 may appear a lot darker and opaque under these circumstances, and watermark 410 may appear a lot more prominent, thereby increasing the difficulty in discerning of text-portion 412b.

Figure 5:
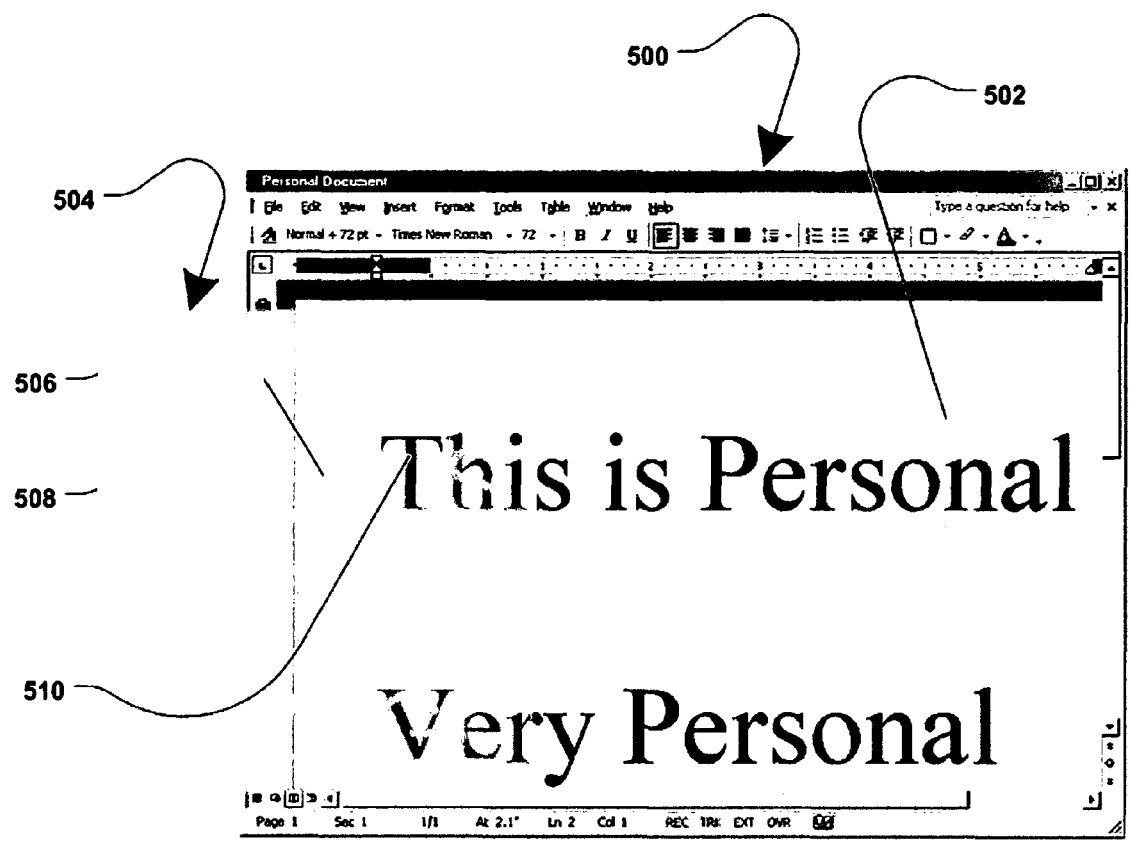
FIG. 5 is a generalized block diagram illustrating another embodiment where a filter window covers an application displayed on a user's device, such that the covered application may be discernable to a user sitting in close to proximity to the display device and not as discernable to a user viewing from a greater distance and angle.

FIG. 5 is generalized block diagram illustrating another embodiment of the present invention where a lighter graphical effect is used in connection with a watermark of a darker color. Secure region 504 covers an application 500 displayed on a user's device, such that the covered application 500 may be discernable to a user sitting in close to proximity to the display device and not as discernable to a user viewing from a greater distance and angle. Secure region 504 may cover a portion of application 500 and include a graphical effects area 506 which uses a shading for the graphical effects in addition to a watermark 510. Graphical effects area 506 may be translucent and of a very light color, such as white. Watermark 508, superimposed on light region 506, may be of a darker, translucent color. While applicable to many different types of monitors or displays, this embodiment may be especially effective against viewers viewing LCD screens from above. It is the nature of LCD screens to invert colors, when viewed from above, which may make document 502 appear to be "washed out" and indiscernible. The optics and physical properties of LCD screens may change the appearance of objects when viewed from different angles and distances. When viewed from above, the colors of objects displayed by an LCD screen may invert, such that light colors appear dark and dark colors appear light. Watermark 508, while mostly transparent and substantially invisible to a user at a normal viewing position, may appear very prominent and further distract the prying viewer from being able to discern the portion 510 of content 502, covered by secure region 504, when viewed from above.

Figure 6:
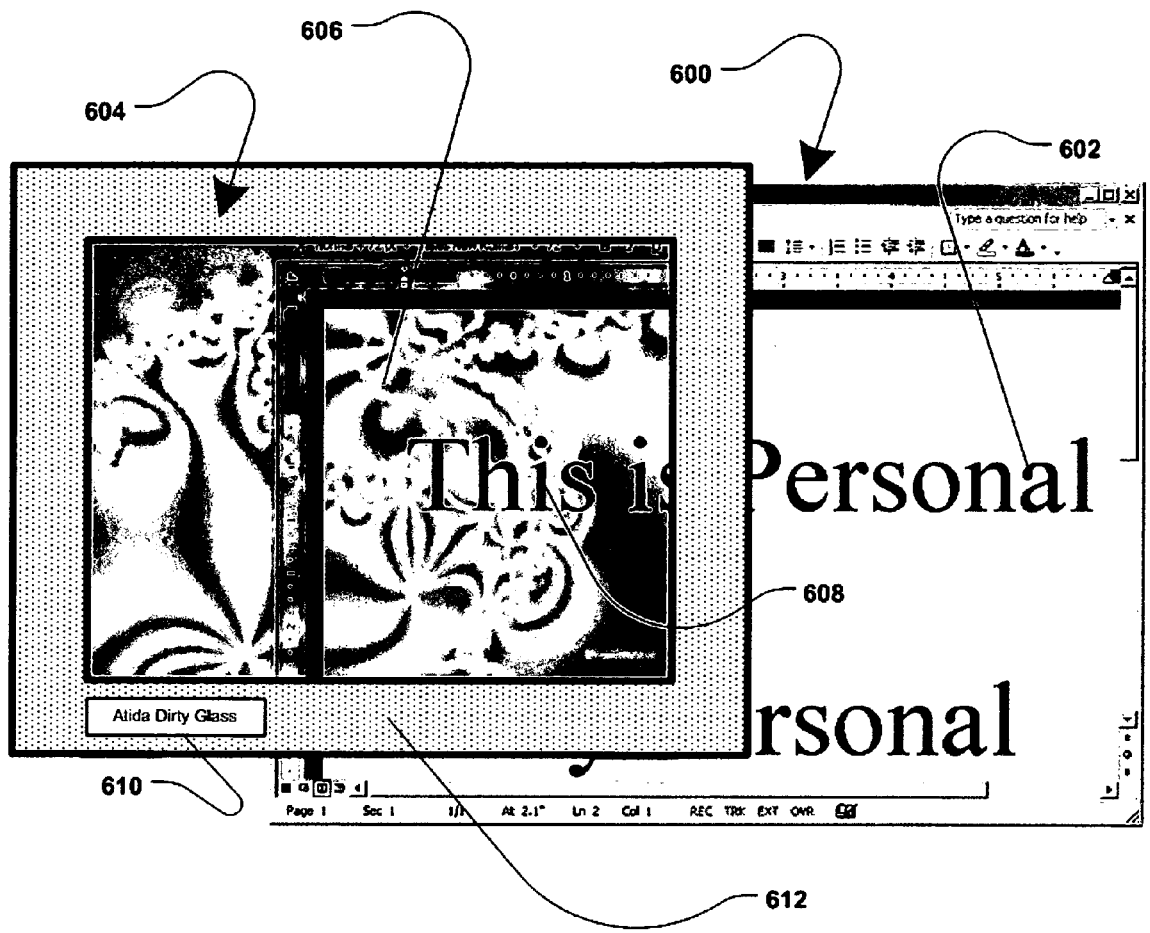
FIG. 6 is a generalized block diagram illustrating another embodiment where a filter window, comprising a complex, translucent pattern, is used to cover a portion of an application.

FIG. 6 is generalized block diagram illustrating another embodiment of the present invention where a filter window, comprising a complex, translucent pattern, is used. Application 600 may display or contain content 602 which may be partially obscured by secure region 604. Secure region 604 may contain a graphical effect 606, which may be an image (e.g. a fractal, photo, etc.) turned translucent. The image may be selected by the computer user, or may be changed in a slide-show format. The portion of the content 608 obscured by secure region 604 may be substantially harder to discern by a prying user viewing application 600 from a greater distance and wider angle than a typical user would. The complexity of graphical effect 606 may serve to further distract the prying user from discerning obscured content 608, though content 608 may remain partly visible to that user. The user may be able to alter the content, coloration, brightness, translucency level and any other visual property of graphical effect 606. In another embodiment of the present invention, a "skin" (graphics of the user's choosing applied to an application) 612 bearing a logo 610 may be a part of secure region 604 to provide application skinning and branding.

Figure 7:
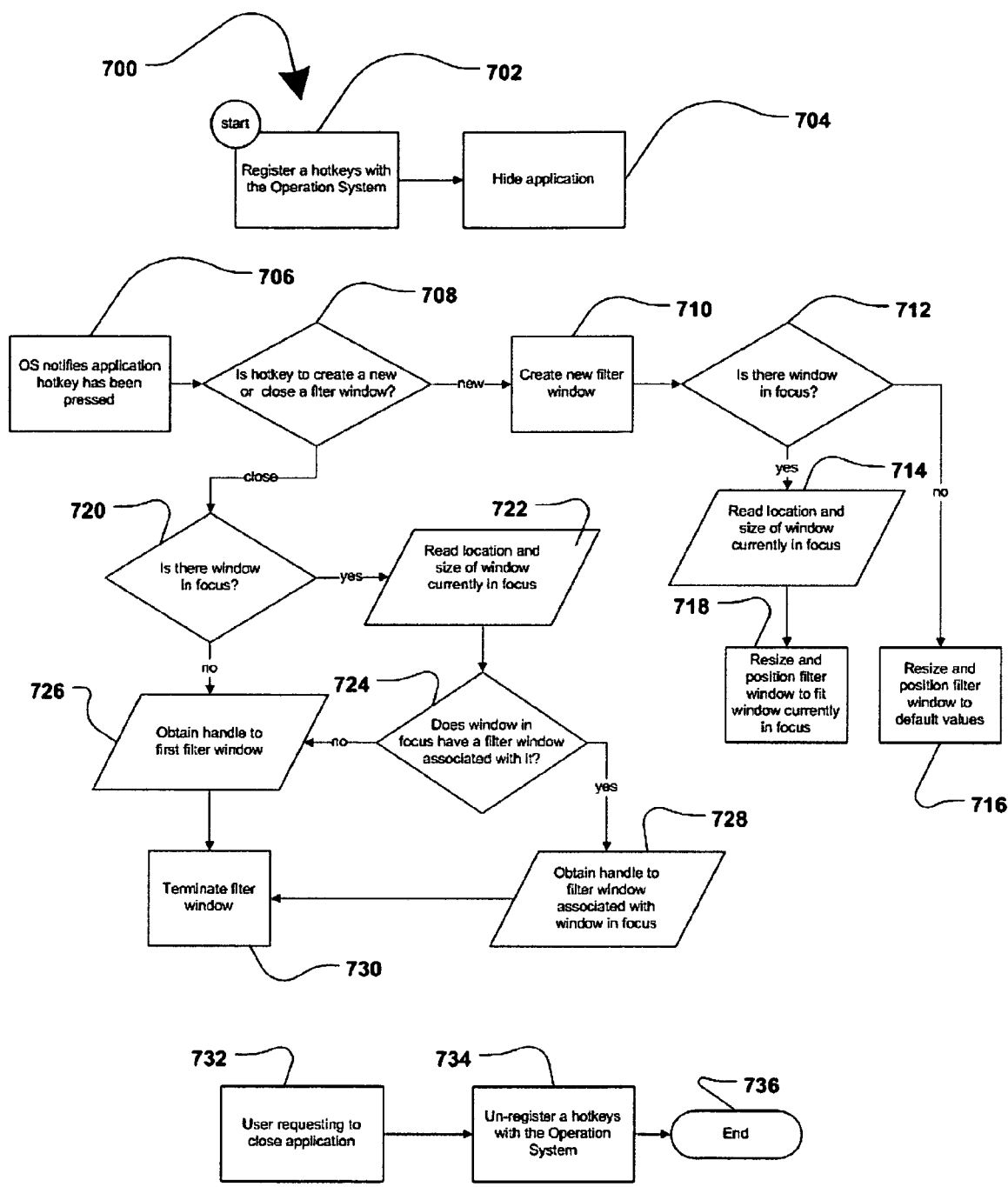
FIG. 7 illustrates the use of a software hot key to open and close security windows, according to one possible embodiment.

Activation of the security window may be accomplished by launching the security window as a program, as done on PCs and other electronic devices, by a button or command associated with an application or operating system, through the use of a dedicated button (as may be included on a smart phone or on a laptop), or through the use of a hotkey. Another possible embodiment is shown in FIG. 7, which is a generalized flow diagram illustrating the use of a software hot key to open and close secure regions or "security windows." A software hot key is a shortcut which allows the user to instruct a computing device to perform a function—such as launch an application—with a single key stroke at any time, regardless of any other applications or processes which may be running. An application may register a hot key with an operating system running on a device, instructing the operating system on what key (or keys) would define the hot-key-shortcut, and what application to invoke once that key (or keys) is pressed. Process 700 registers hot keys with the operation system, allowing the hot keys to open and close security windows, and un-registers the hot keys. At step 702 hot keys are defined and registered with the operating system running on a device, preferably one specific key to designate the launching of a new security window, and one for closing a security window. At step 704 the application which registered the hot keys is hidden such that it may become a process running away from the user's view. At any point in time, a user may press the specific key on the keyboard designated as a hot key in step 702. In step 706, the operating system, having received they user's pressing of a key designated as a hot key, notifies the application controlling security windows. At step 708 a determination is made whether the hot key pressed is a hot key designated for launching a new security window, or closing an existing security window. If at step 708 a determination is made that the hot key pressed was intended to create a new security window, at step 710 a new security window is created. To "apply" the new security window to a window that is currently in focus (or "on top"), at steps 712-716 the newly-created security window may be positioned on top of the current window in focus. In one preferred embodiment, pressing the hot key initiates associating the security window with a specific window in order to cover that window; thus, the newly-created security window should match the location and dimensions of the window in focus. At step 712 a determination is made whether there is a window in focus. At step 714 the location and size of the window in focus are obtained. At step 718 the security window created at step 710 is resized to the location and dimensions determined in step 714. If at step 712 the determination is made there is no window in focus, at step 716 the security window created at step 710 is set to a default location and size. If at step 708 the hot key invoked as denoting closing is identified, at step 720 a determination is made whether there is a window currently in focus. If the determination at step 720 is affirmative, at step 722 the size and location of the window in focus may be obtained. At step 724 a determination may be made whether any one of the existing security windows is associated with the window in focus. The determination may be made by accessing a stored record of security windows associated with other windows; or, it may be determined that, upon recursion of all security windows, the security window having the closest size and position to the window in focus, is said to be associated with the window in focus. Thus, an assumption may be made that that is the security window the user wishes to close and the handle to that security window may be obtained in step 728. Step 730 then terminates that security window. If step 720 determines there is no window in focus, or if at step 724 it is determined there is no security window associated with the window in focus, at step 726 a handle to the first security window is obtained, and at step 730 this window is terminated. In other embodiments of the present invention, at step 726 a handle to the first, last or any arbitrary security window may be obtained; or, at step 726 the security window closest to the mouse cursor may be determined. For a complete shutdown of the application exhibiting the behavior of this invention, at step 732 a message from the operating system indicating the user has taken action to close this application may be received. at step 734 the hot keys registered in step 702 may be un-registered. At step 736 a common procedure to terminate the application's running on the device may be executed.

Figure 8:
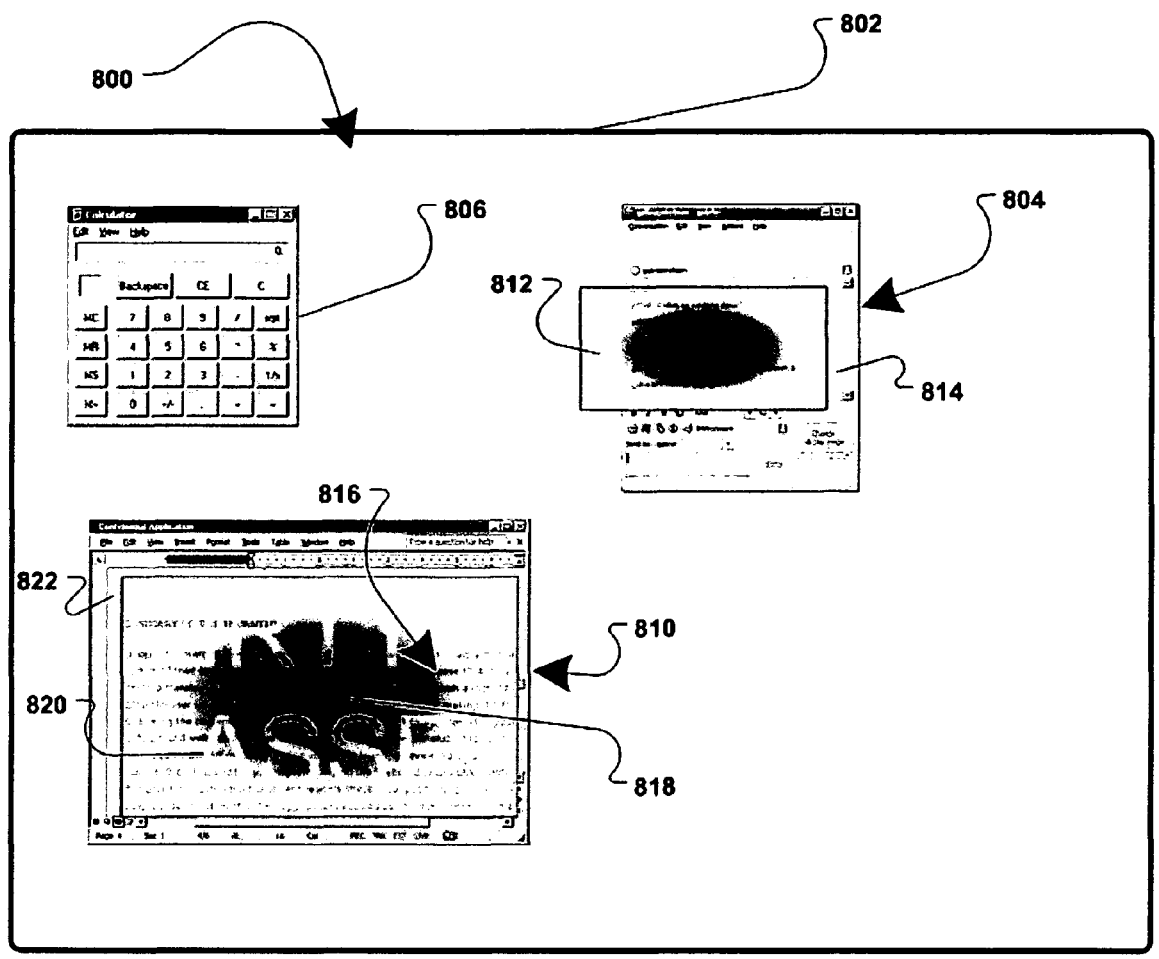
FIG. 8 is a generalized block diagram illustrating multiple security windows may cover multiple areas of the display of a user's device, according to one possible embodiment.

FIG. 8 is a generalized block diagram illustrating another embodiment of the present invention where multiple security windows may cover multiple areas of the display of a user's device 800. A user's display screen 802 may contain multiple application windows 804, 806, 810. The user may determine they wish to "cover" (i.e. obscure by a security window) a portion of application 804. They may also determine they wish to cover application 810 entirely. They may determine application 806 does not need to be obscured as it is of no personal or private nature. To accomplish their goal, the user may invoke multiple security windows. Application 804 may include an area for displaying content 814 which the user may choose to cover with a security window 812. The user would instruct the software, operating in accordance with one embodiment of the current invention, to create a security window 812. Security window 812 may be created at a default location and with a default size; or, in another embodiment of the present invention, security window 812 may be automatically created at the right location and size to cover the application in focus—in the present case, window 804. The user may resize or reposition the security window 812 as they would with any other application, such that it covers any desired portion of application 804. The user may instantiate another security window 816 such that it may cover application window 810. Security window 816 may contain a translucent region of darker shading 818 and a translucent watermark 820 in a lighter shade. Security window 816 may be positioned, either by the user or automatically by the software, in such way that it covers the content portion of application window 810, leaving the margins 822 of application window 810 open to user input. This configuration may allow the operating system to consider application 810 to be "in focus", thus receiving user input though a substantial portion of it may be covered by security window 816. Security windows 812 and 816 may be moved or resized individually. In another embodiment of the present invention, security windows 812 and 816, along with any other similar security windows, may be closed summarily by a single form of user input, such as pressing a "hot key" or closing an application governing the security windows. The user may use a hot key to launch new security windows with a single click.

Figure 9:
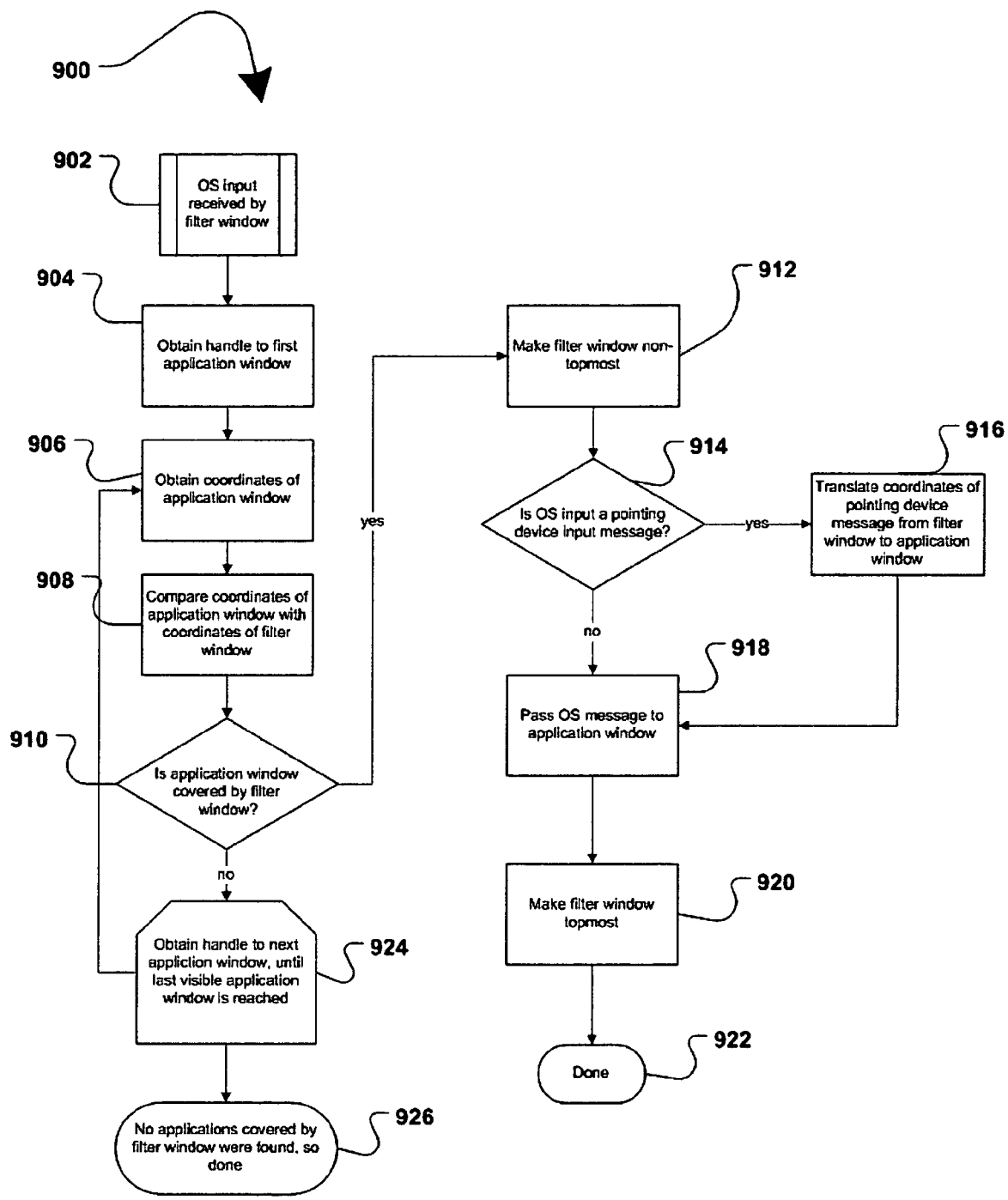
FIG. 9 is a generalized flow diagram illustrating one possible embodiment allowing user input to propagate to an application covered by a filter window.

FIG. 9 is a generalized flow diagram illustrating one possible embodiment allowing user input to propagate to an application covered (or partly covered) by a security window. In a conventional GUI based operating system the application that is "on top" of other windows is the application that will receive user inputs from one or more 10 devices. Process 900 allows the security window to cover the application while still allowing user inputs directed to the application to be received by the intended application. In step 902, user input (key stroke, mouse click, etc.) is received by the client device (in one preferred embodiment, the operating system of the client devices intercepts the user inputs). At steps 904-924 a determination is made of the application window covered by the security window receiving the user input. That is, the covered application is the application that is on "top", or active, in a conventional GUI based operating system but for the layering of the security window. At step 904 the operating-system-issued handle of the first application window is obtained. At step 906 the coordinates and size of the application window whose handle was obtained in step 904, are obtained. At step 908 the coordinates and size obtained in step 906 are compared with the coordinates and size of the security window receiving input. If at step 910 it is determined the application window does not overlap with the security window, at step 924 a handle to the next application window is obtained, and step 906 is reverted to. Steps 904 through 924 repeat until it is determined at step 910 that the coordinates and size of an application window suggest the application overlaps the security window; or, until all application windows have been examined. Upon identifying an application window as overlapping a security window in step 910, at step 912 an instruction to make the security window non-top-most may be issued so that it may receive operating system input. At step 914 a determination is made as to the nature of the user input as being either pointing device input or data input. If at step 914 it is determined that the input is pointing device input, at step 916 the coordinates of the inputted operating system message may be translated to the proper relative coordinates of the application window. At step 918 the translated-coordinate-bearing-input-message may then re-posted to the application. For example, let us assume the application discovered in step 910 is a word processor and the user intended to move the cursor to a new line and left-click to place the edit cursor at that specific location in the document, displayed within the word processor application. A security window may cover the word processor and may be considered the application in focus, causing the user mouse move-and-click, intended for the word processor, to be directed to the security window by the operating system. At steps 912 through 918 the word processor application window may temporarily be brought into focus and be sent the translated coordinates for the mouse instruction the user had indented to send. Coordinate translation me be necessary as pointing device movement coordinates may differ among various applications displayed on the same screen. If at step 914 it is determined the input message is data (such as a user typing text) at step 918 the data intercepted by the security window would be re-posted, to the application. At step 920 the operating system may be instructed to make the security window top most, so it would cover the application once more. From a user's perspective, it may appear the cursor moved smoothly and as intended within the word processor application, or their keystrokes registered instantaneously with the document, as the process in flow chart 900 would typically happen in milliseconds and may imperceptible to a user. In an alternate embodiment, process 900 may remove the security window from the top of the applications in the operating system as far as input is concerned (yet keep the security window topmost as far as display is concerned). In such an embodiment, input is directed to the application the operating system considers as topmost/active while continuing to cover the designated area or application with the security window.

Figure 10A:
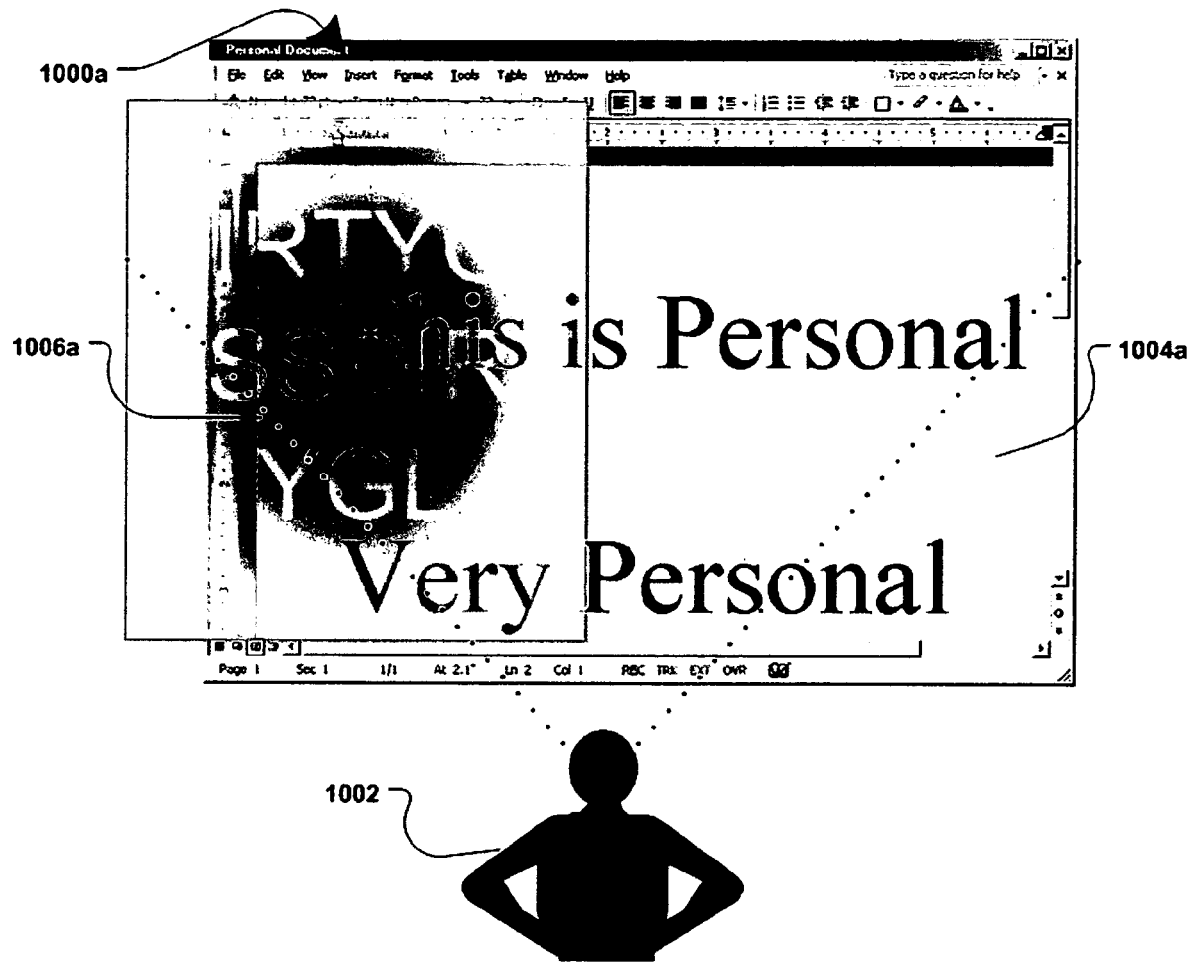
FIGS. 10A & 10B is a generalized flow diagram illustrating the process of the visual effect that may be created by a computer system operating according to one embodiment of the present invention.
Figure 10B:
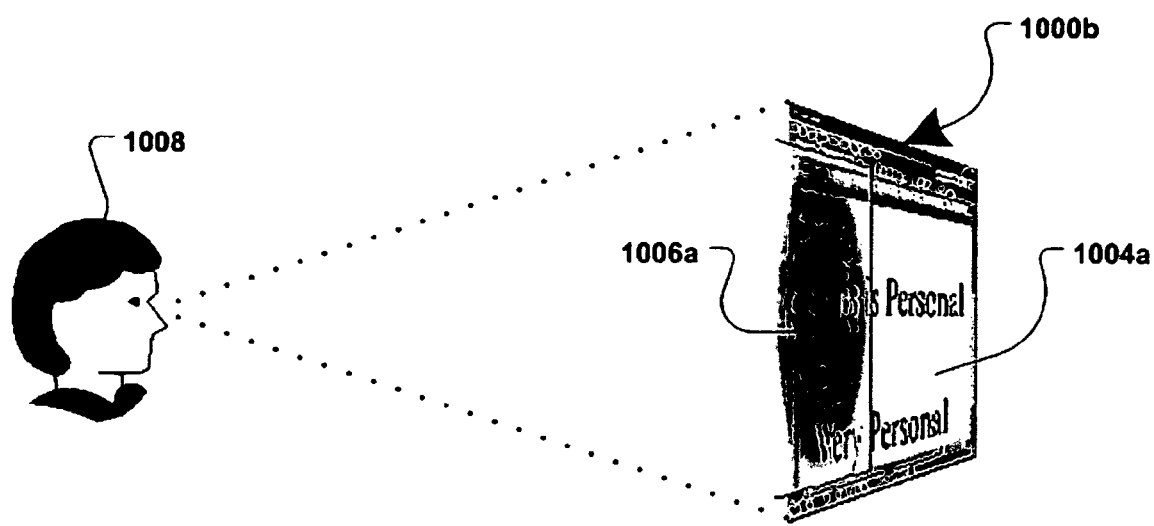

FIGS. 10A and 10B are generalized block diagrams illustrating the visual effect that may be created by a computer system operating according to one embodiment of the present invention. Application 1000a may be viewed by a user 1002 sitting at a normal viewing position of a device's display (i.e. substantially in front of the display, leveled with it and in relatively close proximity.) As shown, FIG. 10A illustrates a view essentially from behind the user 1002. FIG. 10B illustrates a view essentially from one side of a user. Application 1000a may be partially obscured by filter window 1006a, which may include a frame, a darker translucent region and a lighter translucent watermark. Application 1000a may contain content 1004a which in this case contains the text "This is Personal Very Personal". The words "This" and "Very" happen to be obscured by filter window 1006a, possibly due to the user's positioning of filter window 1006a at that given location. Nonetheless, the user 1002 is still able to read "through" filter window 1006a and discern the phrase "This is Personal Very Personal". Another user 1008 may look at the same display device, displaying the same application 1000b, from a greater distance and broader angle. While the portion of text 1004b, not covered by filter window 1006a, remains discernable, the text portion of 1004b, such as the word "This", is indiscernible. The optical distortion that filter window 1006a/b—with its translucent dark pattern and watermark—causes to covered application 1004a/b may magnify as the distance between the viewer and the display device increases. Thus any unintended user not in an ideal position to view the display, may find discerning any portion of the display covered by a filter window to be difficult or impossible.

Figure 11:
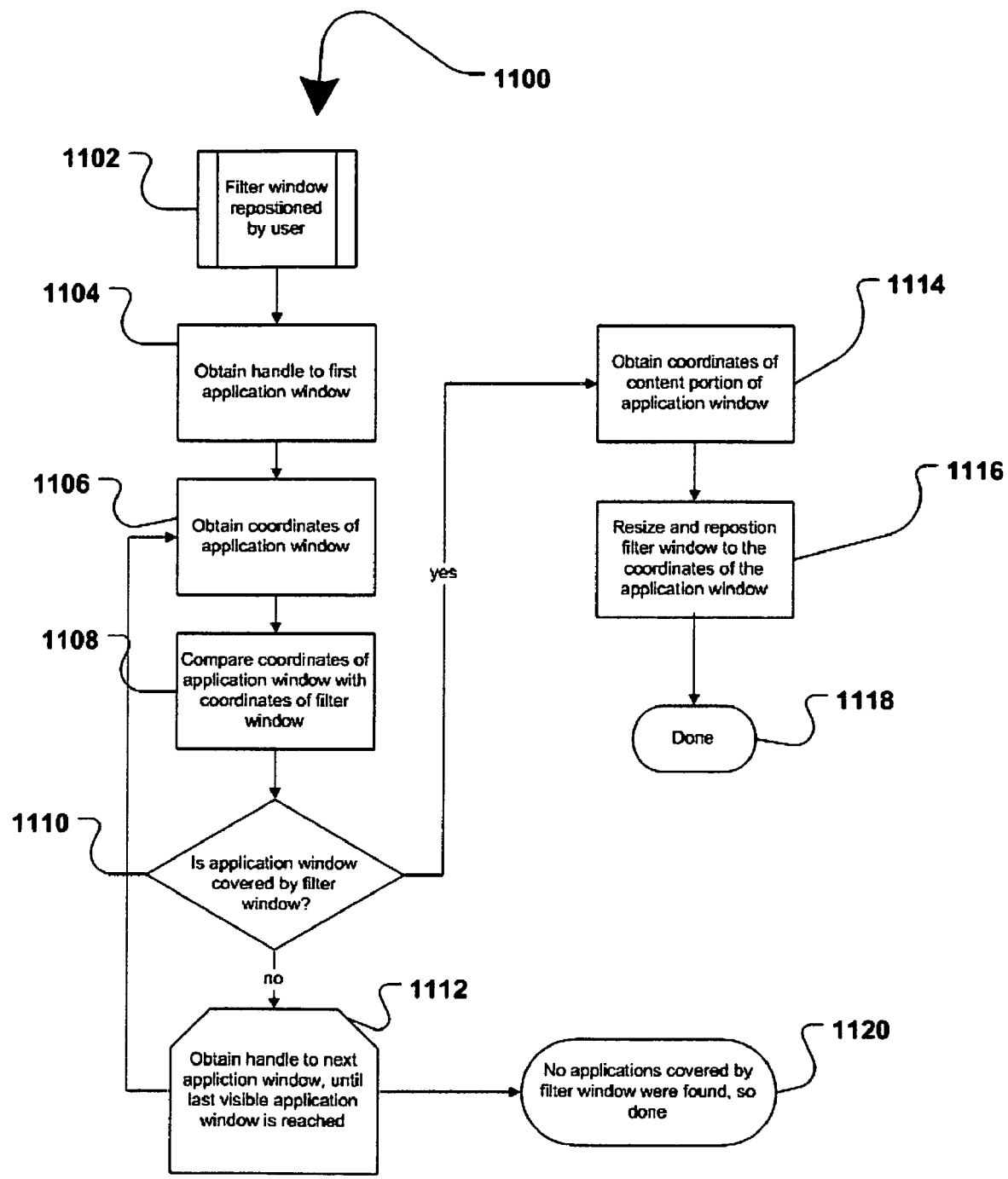
FIG. 11 illustrates the automatic sizing of a security window to cover the working area of an application, according to one possible embodiment.

FIG. 11 is a generalized flow diagram illustrating another embodiment of the present invention allowing for the automatic resizing of a filter window to cover only the contents portion of an application. When a user repositions a filter window in step 1102, the application responsible for filter windows may try to identify and application window covered by the filter window in steps 1104-1112. In step 1104 the handle to the first application window registered with the operating system may be obtained. At step 1106 the coordinates of the first window obtained in step 1104 may be obtained. At step 1108 the coordinates of the application window and filter window may be compared, to determine whether both windows overlap. Various embodiments of the present invention could determine whether such overlap exists, in various ways and varying degrees of tolerance. For example, an overlap could be determined to exist if the coordinates of the given application window match the coordinates of the filter window more closely than the coordinates of any other application window. If at step 1110 it is determined such overlap exists and the application window is covered by the filter window, step 1114 may be executed. At step 1114 application programming interface calls may be used to obtain the content portion of the application window. For example, if the application window is a web browser, at step 1114 the coordinates of the webpage displayed within the browser window may be obtained, as opposed to the entire browser application window, which includes toolbars and skin. This step may allow the user to cover a smaller part of their screen, confined to information which is truly personal, as opposed to covering generic parts of applications such as toolbars. At step 1116 the filter window may be repositioned and resized to fit the coordinates obtained in step 1114. Step 1118 is then reached which ends the current flow. If at step 1110 it is determined the current application window does not overlap the filter window, step 1112 may advance to the next application window registered with the operation system, until all windows have been examined. If no window has been found to overlap, at step 1120 the current flow end.

Figure 12:
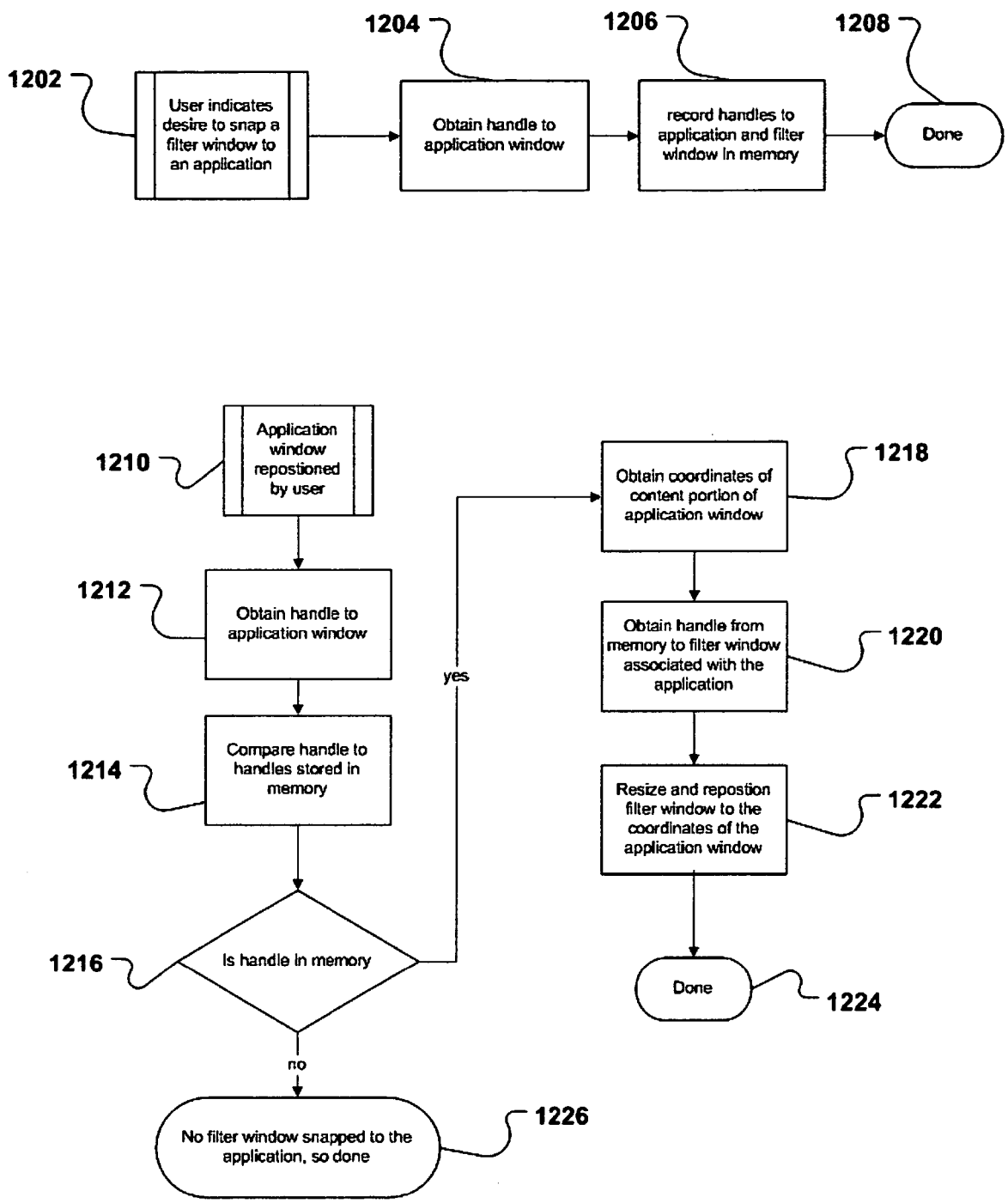
FIG. 12 is a generalized flow diagram illustrating a security window is associated with an application such that the security window automatically adjusts to the size and shape of a specific application as the application is repositioned.

FIG. 12 is a generalized flow diagram illustrating another embodiment of the present invention allowing for "snapping" a filter window to an application such that the filter window automatically adjusts to the size and shape of a specific application as the application is repositioned. Steps 1202-1208 are allowing the user to associate a filter window with an application, which may also be referred to as "snapping" a filter window to an application. In step 1202, the user could use one of many ways of communicating to the software their desire to snap a specific filter window to a specific application. In one embodiment the user may position a filter window over an application window, then right-click on the filter window to cause a menu to pop up, and then choose an option like "snap filter window to this application." In step 1204 a handle to the application window to which the user chose to snap the filter may be retrieved. In step 1206 the association between the filter window and application window may be recorded in the application's own memory space. Step 1208 ends the current flow until the user takes further action in the future. Once the user repositions an application window (e.g. if the application is an internet browser, the user may resize it and reposition it on the screen) step 1210 may be invoked, triggered by a standard operating system message of the window's repositioning. In one possible embodiment the filter window application may need to monitor operating system messages and trigger on messages calling for the movement of windows. In step 1212 a handle to the application window repositioned may be obtained. In step 1214 the handle of the window being repositioned may be compared with the handles placed in memory in step 1206 to determine whether there is an association between the application window the user is moving and any filter window. If in step 1216 it is determined the handle of the window being repositioned is recorded in memory, i.e. there is a filter window associated with that application window, steps 1218-1224 may be invoked. In step 1218 the coordinates of the client-portion of the application window in step 1212 may be obtained. At step 1220 the handle to the specific filter window that had been associated with the application window in step 1212, in step 1206, may be obtained from the software's memory space. At step 1222 the filter window may be resized and repositioned to fit within the client-portion coordinates from step 1218. Step 1224 ends the current flow. If at step 1216 a match between the handle of the application window in step 1212 and the handles stored in the software's memory space in step 1206, is not found, the flow may end. The assumption is that the user has moved an application window which had not been associated with a filter window, so there is no reason for the software to take action.

Figure 13:
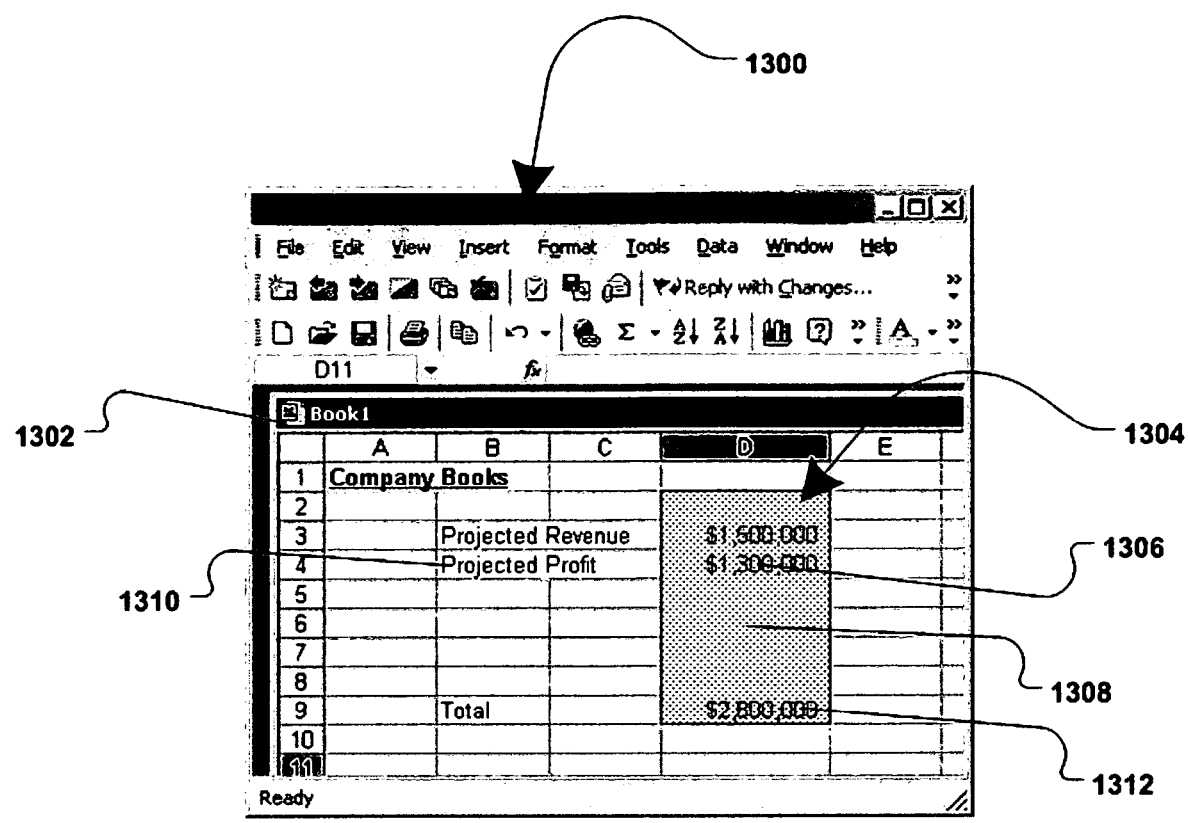
FIG. 13 is a generalized block diagram illustrating an alternate embodiment where security regions may be associated with an object in a document, allowing the security window to cover all (or any subset thereof) of the appearances of the object in the document.

FIG. 13 is a generalized block diagram illustrating an alternate embodiment where security regions may be associated with an object in a document, allowing the security window to cover all (or any subset thereof) of the appearances of the object in the document. As shown, an application 1300 such as Excel® by Microsoft may have one or more cells (D2-D9 FIG. 13) covered by a security window 1304. Application 1300 may contain one or more documents 1302. A document 1302 may contain one or more objects. (The definition of an object herein is any portion of an application which obtains a handle from the operating system. E.g. in an Excel® spreadsheet, every cell obtains a unique handle from the operating system, and this is an object. Document 1302 is in itself an object, as it is addressable by a unique handle assigned by the operating system.) Other examples of objects which may be tagged for association with a security window include a given word, phrase, or combination of words used in a document (such as the names of the parties in a contract, e.g. "Dr. Wellfield" or "Morgan Stanley"), figures, icons, images, numbers, etc. In this alternate embodiment, the user may instruct the security window software to affix one or more security windows 1304 to one or more objects in application 1300. Document 1302 contains cells A1-E11. The user may enter data into various cells, such as the word "Projected" into cell B4 1310 and the number "$1,300,000" into cell D4 1306, as part of the normal operation of application 1300. The user may instruct the creation of security window 1304 which may contain a shaded region 1308. The user may affix the security window 1304 to specific objects such as cells D2, D3, D4, D5, D6, D7, D8 and D9, in document 1302 which is part of application 1300. The user may do so to enhance privacy over specific objects containing sensitive data, such as cell D4 1306, while keeping other cells, such as B4 1310, containing less sensitive data, un-obscured. Upon receiving instruction to be affixed to specific objects (cells D2, D3, D4, D5, D6, D7, D8 and D9) security window 1304 may track the location and size of these objects and adjust itself to any changes in their physical disposition, automatically. For example, if the user chooses to scroll the worksheet document 1302 to the right (such that column D would shift left to occupy the present location of column C), security window 1304 would reposition itself in a similar manner, such that cells D2-D9 would remain covered by it in their new position. In an embodiment where the user chooses to associate a key word or similar object with a security window, a security window covering the associated object will be generated when and where the associated object appears in the document or application.

Figure 14:
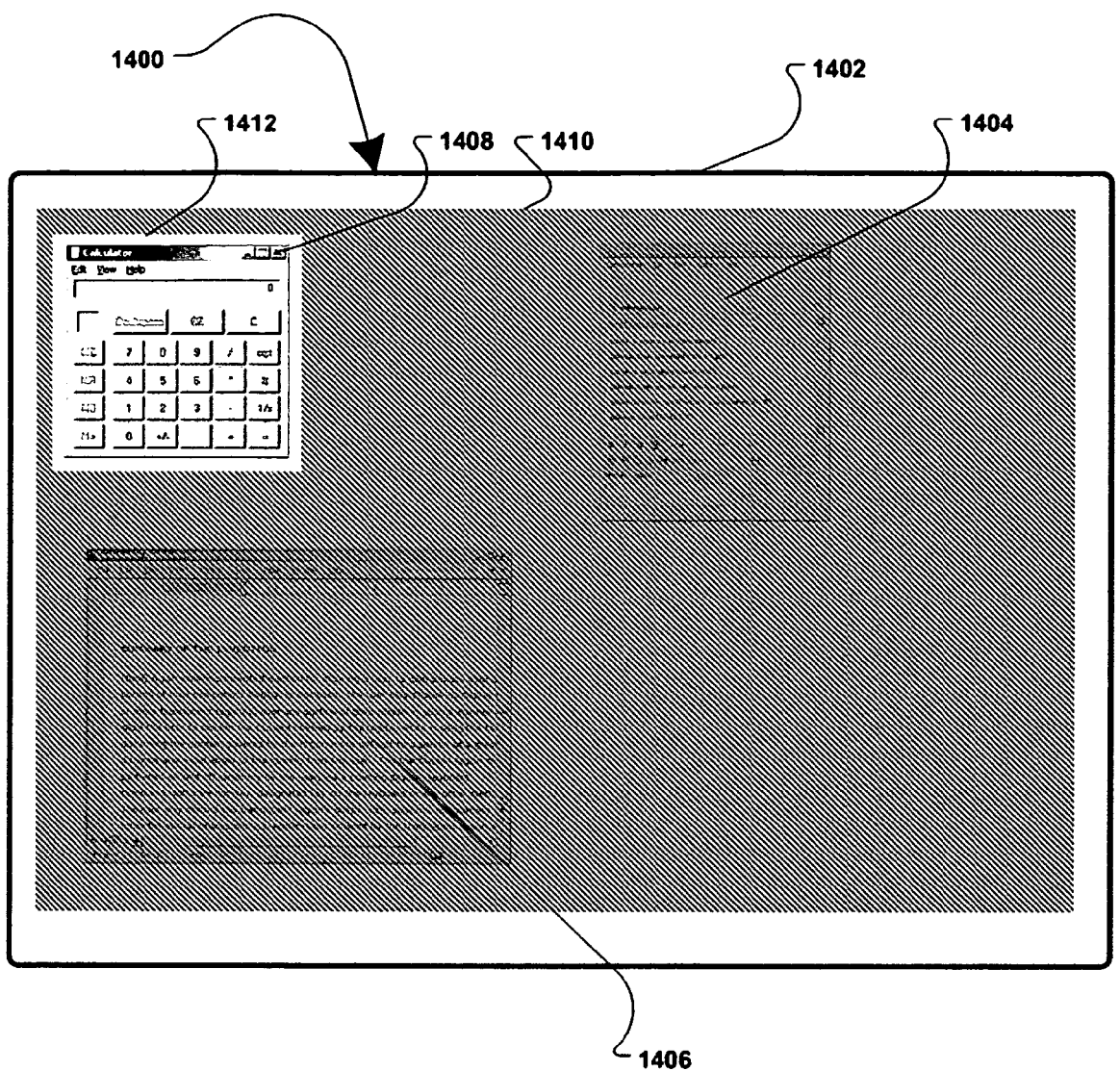
FIG. 14 is a generalized block diagram illustrating an alternate embodiment where security regions may be arranged around a viewing window to allow a computer user to view an area of an application or desktop while covering other areas of the document with a security region.

FIG. 14 is a generalized block diagram illustrating an alternate embodiment where security regions may be arranged around a viewing window to allow a computer user to view an area of an application or desktop while covering other areas of the document with a security region. In one preferred embodiment the viewing window 1412 and security region 1410 may be repositioned and/or resized/reshaped according to the working area of the applications 1404, 1406, 1408 and desktop 1402, or according to the preferences of a user. The user may decide that the entire desktop 1402 (or a large portion of the desktop) should be covered by a security window 1410, such that the view of the desktop and any applications 1404, 1406 displayed on it may be obstructed. The user may define a viewing window 1412 which leaves a region of the desktop 1402 un-obstructed. The user may position and size viewing window 1412 over an application in a manner allowing any content inside viewing window 1412, such as application 1408, to remain unobstructed. In the example shown in FIG. 14, view window 1412 allows unobstructed view of application 1408, which is a calculator. Applications 1404 and 1406, which may be of a more sensitive nature, remain obstructed by security window 1410. In another embodiment, the size and position of the application 1408 displayed in the view window 1412, are tracked in a manner allowing view window 1412 to adjust automatically to application's 1408 new size and position, as the latter moves or is resized.

What is claimed is:

1. A method of providing visual effects to enhance security of information displayed by an electronic device, the electronic device capable of outputting a signal to a display for displaying information to a user of the device, comprising:
   generating a software-based security window on an area of the display, wherein the security window includes a graphical effect covering at least a portion of the area of the security window,
   wherein the graphical effect is translucent and reduces the visibility of information displayed in the area covered by the graphical effect.

2. The method of claim 1, further comprising:
   receiving inputs from a user;
   treating the inputs from the user as inputs to an application or process covered by the security window.

3. The method of claim 1, wherein the security window further includes a border, and wherein the graphical effect substantially fills the area defined by the security window border.

4. The method of claim 3, wherein the security window border responds to commands from a user of the device to resize the security window.

5. The method of claim 1, wherein the security window is associated with an application running on the electronic device such that the security window covers at least a portion of the associated application.

6. The method of claim 5, wherein the graphical effect of the security window associated with the application covers a working area of the application.

7. The method of claim 1, wherein the security window is generated by an application, and wherein the security window covers at least a portion of the working area of the application.

8. The method of claim 1, further comprising a graphical control to adjust the transparency of the graphical effect of the security window.

9. The method of claim 8, further comprising a second graphical control to adjust the transparency of the graphical effect of the security window, wherein the first graphical control adjusts a pattern used in the graphical effect, and wherein the second graphical control adjusts the brightness of the graphical effect.

10. The method of claim 1, wherein the security window is associated with an object in a document, further comprising:
  determining whether the associated object is displayed in the working area of an application; and
  generating a security window to substantially cover the associated object displayed in the working area of the application.

11. The method of claim 10, wherein the application is a spreadsheet program, and wherein the associated object is at least one cell of a document which may be used by the spreadsheet program.

12. The method of claim 10, wherein the application is a word processing program, and wherein the associated object is at least one set of characters of a document which may be used in a document which may be displayed in the working area of the word processing program.

13. The method of claim 10, further comprising:
  receiving an input from a user;
  identifying which application document object is associated with the received input; and
  associating the graphical effect with the object associated with the received input such that the graphical effect covers at least a portion of the associated object; and
  repositioning the graphical effect to maintain coverage of the of the associated object in response to a repositioning of the associated object.

14. The method of claim 1, further comprising:
  determining which application is active on the electronic device; and
  forwarding user inputs to the active application.

15. The method of claim 14, wherein user inputs are directed to the security window in response to a user input indicating the security window is to be adjusted.

16. The method of claim 15, wherein the user input indicating the security window is to be adjusted is an input to a border area of the security window.

17. The method of claim 16, wherein the user input indicating the security window is to be adjusted is an input to a graphical control associated with the security window.

18. The method of claim 1, wherein the graphical effect region includes an image.

19. The method of claim 1, wherein the graphical effect region includes a watermark.

20. The method of claim 1, further comprising:
  receiving an input from a dedicated button; and
  in response to receiving the input from the dedicated button, generating a security window.

21. The method of claim 1, wherein the area filled by the graphical effect corresponds to the working area of an application.

22. The method of claim 1, wherein the area filled by the graphical effect corresponds to an object which may be displayed in the working area of an application.

23. The method of claim 1, further comprising providing at least one graphical effect control, wherein user inputs to the graphical effect control alter the transparency of the graphical effect.

24. The method of claim 1, further comprising providing at least one graphical effect control, wherein user inputs to the graphical effect control alter the area covered by the graphical effect.

25. The method of claim 1, further comprising:
  receiving an input from a user;
  identifying which application is associated with the received input; and
  associating the graphical effect with the application associated with the received input such that the graphical effect covers at least a portion of the associated application; and
  repositioning the graphical effect to maintain coverage of the at least a portion of the associated application in response to a repositioning of the associated application.

26. The method of claim 25, wherein the area covered by the graphical effect is the working area of the associated application.

27. A method of providing visual security enhancements to a display associated with an electronic device, comprising:
  generating a graphical effect,
  filling at least a portion of the area of the display with the graphical effect, and
  enabling user inputs directed to a process covered by the graphical effect to be received by the process.

* * * * *